United States Patent [19]
Webb

[11] Patent Number: 5,515,467
[45] Date of Patent: May 7, 1996

[54] OPTICAL FIBER ASSEMBLY FOR CONNECTING PHOTONIC DEVICES TO A FIBER OPTIC CABLE

[75] Inventor: Brian Webb, Chandler, Ariz.

[73] Assignee: Motorola, Inc., Schaumburg, Ill.

[21] Appl. No.: 366,934

[22] Filed: Dec. 30, 1994

[51] Int. Cl.⁶ ........................................ G02B 6/36
[52] U.S. Cl. ................... 385/88; 385/94; 385/92
[58] Field of Search ................... 385/88–94, 31, 385/14, 49

[56] References Cited

U.S. PATENT DOCUMENTS

| | | | |
|---|---|---|---|
| 4,595,839 | 6/1986 | Braun et al. | 250/551 |
| 4,911,519 | 3/1990 | Burton et al. | 385/14 |
| 5,109,454 | 4/1992 | Okuno et al. | 285/92 |
| 5,119,451 | 6/1992 | Wills et al. | 385/14 |
| 5,123,066 | 6/1992 | Acarlar | 385/14 |
| 5,199,087 | 3/1993 | Frazier | 385/14 |
| 5,384,873 | 1/1995 | Chun et al. | 385/31 |
| 5,416,869 | 5/1995 | Yoshino | 385/88 |
| 5,430,820 | 7/1995 | van Tongeren et al. | 385/94 |

*Primary Examiner*—John D. Lee
*Assistant Examiner*—Phan T. H. Palmer
*Attorney, Agent, or Firm*—Miriam Jackson

[57] ABSTRACT

A connector affixed to the end of a cable of optical fibers and having alignment pins extending axially in parallel with the cable and beyond the end thereof. A substrate with alignment holes and light transmitting openings therethrough in axial alignment with the ends of the optical fibers when the alignment pins and holes are engaged. The substrate including mounting pads, electrical connection pins and electrical traces connecting the pads to the pins. A semiconductor die, with photonic devices thereon, mounted on the mounting pads of the substrate so that each photonic device is aligned with a light transmitting opening and electrically connected to the electrical connection pins. A sleeve surrounding and securing the connector to the mounting member.

24 Claims, 2 Drawing Sheets ns:5,515,467

OPTICAL FIBER ASSEMBLY FOR CONNECTING PHOTONIC DEVICES TO A FIBER OPTIC CABLE

FIELD OF THE INVENTION

The present invention pertains to fiber optic cable and more specifically to connecting photonic devices to a fiber optic cable.

BACKGROUND OF THE INVENTION

Recently, many attempts have been made to utilize optical fibers for carrying large quantities of signals or information relatively short distances within large systems, such as main-frame computers and the like. It is well known that optical fibers have a much larger frequency bandwidth than electrical wires and that optical fibers are not subject to outside interference, as is the case with electrical wires. Thus, the use of optical fibers in place of at least some electrical wires has many advantages and is highly desirable.

However, one drawback to the use of optical fibers is the difficulty in fabricating connectors for converting electrical signals into light and directing the light into the optical fibers, and for directing the light at the other end of the optical fiber onto a photonic device for converting the light back into an electrical signal. Optical fibers are very small and difficult to work with, single mode optical fibers, for example, having a core on the order of nine micron in diameter.

Thus, it would be highly desirable to provide easily fabricated connector assemblies for connecting photonic devices to the ends of optical fibers.

It is a purpose of the present invention to provide a new and improved optical fiber assembly.

It is another purpose of the present invention to provide a new and improved optical fiber assembly which is relatively easy and inexpensive to fabricate.

It is still another purpose of the present invention to provide a new and improved optical fiber assembly utilizing improved fabrication techniques.

It is still another purpose of the present invention to provide a new and improved optical fiber assembly utilizing improved fabrication techniques which improve the yield.

It is a further purpose of the present invention to provide an optical fiber assembly in which an optical fiber cable is connected directly to an array of photonic devices and which optical fiber cable connects directly to electronic apparatus.

SUMMARY OF THE INVENTION

The above problems and others are at least partially solved and the above purposes and others are realized by an optical fiber assembly including a connector affixed to an end of an optical fiber, the connector having alignment pins extending axially in parallel with the optical fiber and beyond the end thereof. A mounting member has alignment holes therein positioned to receive the alignment pins and a light transmitting opening therethrough positioned to be in axial alignment with the end of the optical fiber when the alignment pins are engaged in the alignment holes. The mounting member further has mounting pads formed thereon, a plurality of electrical connection pins extending outwardly, generally parallel with the alignment holes and electrical traces connecting the mounting pads to the connection pins. A semiconductor die has at least one photonic device formed thereon, with each photonic device defining a working area and activating terminals. The die is mounted on the mounting pads of the mounting member so that the working area of the photonic device is aligned with the light transmitting opening and the activating terminals are electrically connected to the electrical connection pins. A sleeve surrounds the connector and the mounting member, securing the connector to the mounting member.

The above problems and others are at least partially solved and the above purposes and others are further realized in a method of fabricating an optical fiber assembly including the steps of providing a connector with an end of the optical fiber affixed thereto, the connector having alignment pins extending axially in parallel with the optical fiber and beyond the end thereof, forming a mounting member having alignment holes therein positioned to receive the alignment pins and a light transmitting opening therethrough positioned to be in axial alignment with the end of the optical fiber when the alignment pins are engaged in the alignment holes, forming mounting pads on the mounting member and forming a plurality of electrical connection pins extending outwardly, generally parallel with the alignment holes and electrical traces connecting the mounting pads to the connection pins, fabricating a semiconductor die with a photonic device thereon, the photonic device defining a working area and activating terminals, mounting the die on the mounting pads of the mounting member so that the working area of the photonic device is aligned with the light transmitting opening and the activating terminals are electrically connected to the electrical connection pins, inserting the alignment pins of the connector in the alignment holes of the mounting member. and providing a sleeve and positioning the sleeve in surrounding engagement with the connector and the mounting member, the sleeve securing the connector and mounting member together.

DESCRIPTION OF THE PREFERRED EMBODIMENTS

Figure 1:
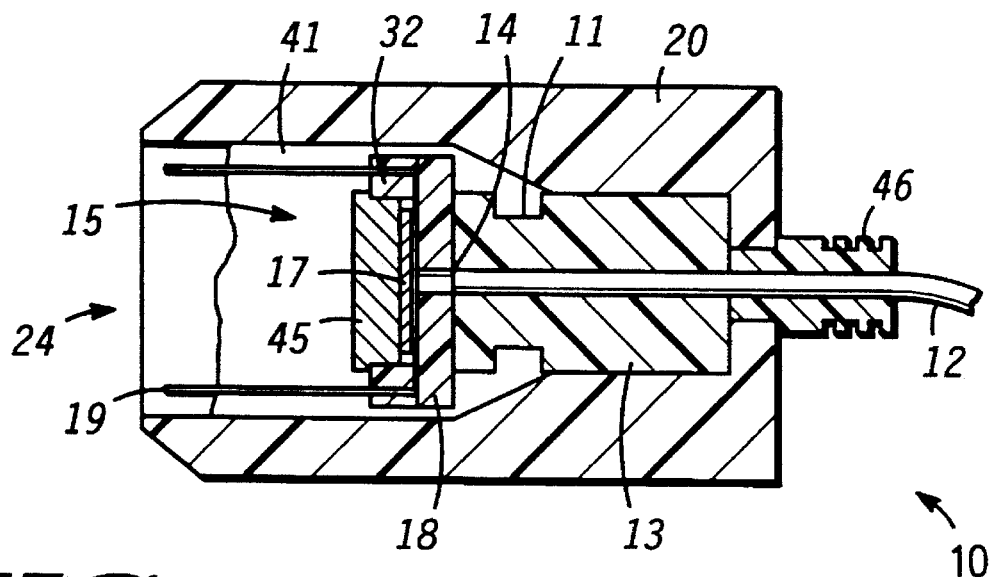
FIG. 1 is a sectional view of an optical fiber assembly in accordance with an embodiment of the present invention.
Figure 2:
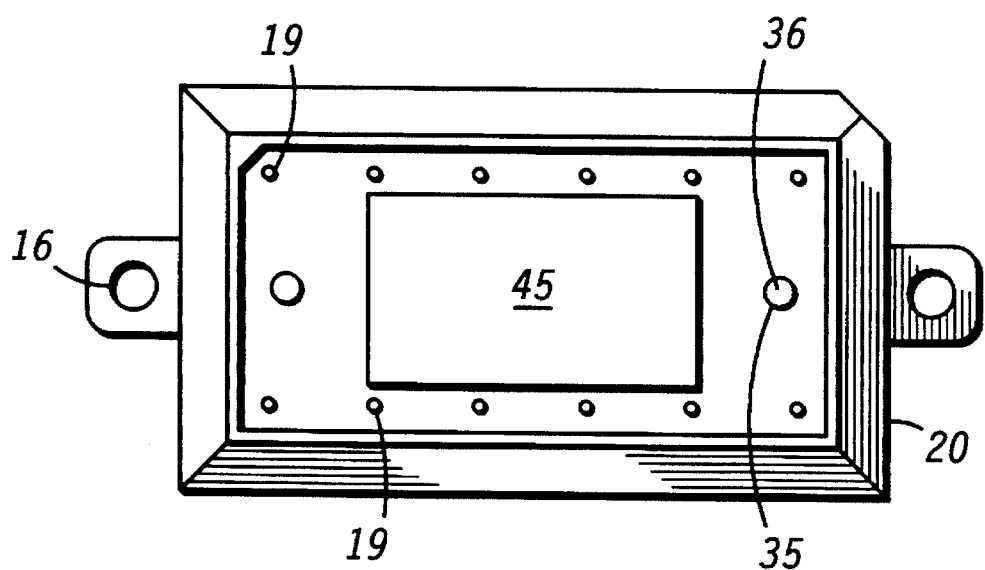
FIG. 2 is a view in end elevation of an optical fiber assembly in accordance with an embodiment of the present invention.

Turning now to the drawings in which like reference characters indicate corresponding elements throughout the several views, attention is first directed to FIGS. 1 and 2 which illustrate an optical fiber assembly generally designated by the reference number 10 constructed in accordance with the teachings of the present invention.

FIG. 1 is a cross-sectional view of an embodiment of the present invention, while FIG. 2 is an end view of an embodiment of the present invention. Optical fiber assembly 10 includes an optical fiber 12 having an end 14 with a connector 13 affixed thereto. An optical interface unit 15 having a semiconductor die 17 affixed to a mounting member 18, is coupled to connector 13. Mounting member 18 has a plurality of electrical connection pins 19 extending therefrom and in electrical communication with an array of photonic devices formed on semiconductor die 17. In the embodiment shown in FIG. 1, mounting member 18 includes a ridge 32 extending around the periphery thereof. Ridge 32 defines a central area in which semiconductor die 17 is positioned, and is an optional feature of the present invention. Connector pins 19 are mounted in ridge 32 to provide them with additional support.

A sleeve 20 surrounds and secures connector 13 to optical interface unit 15. Semiconductor die 17 and or heatsink 45 may be protected by potting compound 41 disposed thereon. In the embodiment shown in FIG. 1, potting compound 41 also is disposed around mounting member 18 and in locks 11 formed in connector 13. Thus further securing semiconductor die 17 and mounting member 18 onto connector 13. Locks 11 are an optional, but preferred feature of the present invention.

Also, sleeve 20 includes a pair of bulkhead bosses 16 (shown only in FIG. 2) extending outwardly from opposite sides thereof. Each bulkhead boss 16 has a securing screw 21 (shown only in FIG. 4) journeyed therein for securing assembly 10 to a mating connector (to be described presently) in a bulkhead or the like. It will of course be understood that a variety of apparatus may be utilized to secure apparatus 10 into a mating connector all of which will occur to those skilled in the art.

Figure 3:
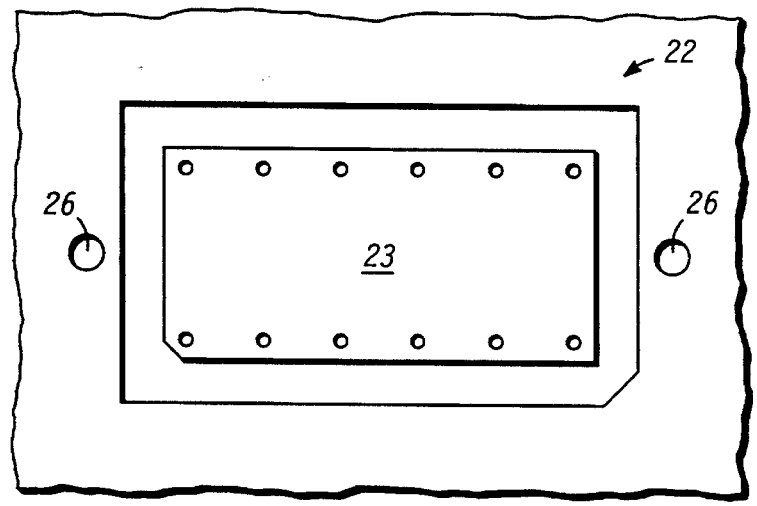
FIG. 3 is a simplified view in perspective of electronic apparatus used with the optical fiber assembly of the present invention.

Turning now to FIG. 3, an electrical apparatus 22 is illustrated including a standard female receptacle 23, mounted in a bulkhead of electrical apparatus 22 for connection of electrical signals to apparatus 22. The bulkhead of electrical apparatus 22 includes threaded openings 26 spaced on opposed sides of female receptacle 23 for receiving securing screws 21 of assembly 10 threadly therein to ensure the mechanical connection of assembly 10 to the bulkhead of electrical apparatus 22 while allowing correct alignment of connection pins 19 in female receptacle 23.

Sleeve 20 and connection pins 19 are configured to engage female receptacle 23 and electrically connect semiconductor die 17 to electrical apparatus 22. As illustrated in FIG. 1, sleeve 20 defines an axially extending cavity 24 with connector pins extending outwardly therein to form a male electrical connector. Cavity 24 aids in protecting connector pins 19 during nonuse and aids in guiding pins 19 into female receptacle 23.

With additional reference to FIG. 2, it can be seen that outer edges of the end of sleeve 20 are beveled to facilitate insertion into female receptacle 23. Also, in this specific embodiment, a corner of sleeve 20 is beveled to provide an index feature for orientation of optical fiber assembly 10 relative to female receptacle 23. It will of course be understood that sleeve 20 may be terminated proximate optical interface unit 15 in some applications, which formation may in such applications aid in the fabrication of the optical fiber assembly 10.

Figure 4:
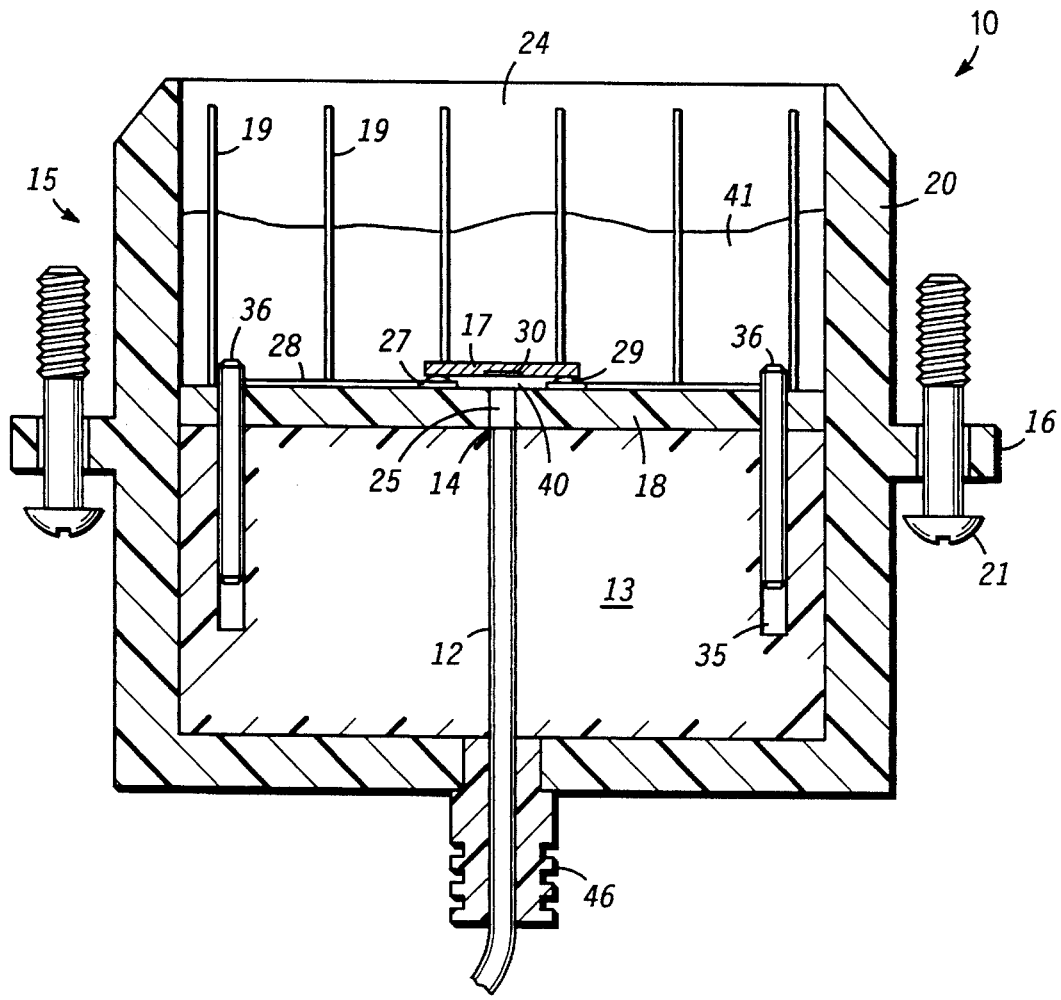
FIG. 4 is an enlarged sectional view of the optical fiber assembly, illustrating details of the assembly in accordance with an embodiment of the present invention.

Referring now to FIG. 4, an enlarged sectional view of the optical fiber assembly cut through bulkhead bosses 16, is illustrated, showing details of optical fiber assembly 10 and specifically details of optical interface unit 15. Mounting member 18 functions to support and align semiconductor die 17 and connector 13. To this end mounting member 18 includes a light transmitting opening 25 formed therethrough. Light transmitting opening 25 is positioned in axial alignment with end 14 of optical fiber 12. Mounting member 18 further includes mounting pads 27 formed thereon and electrical traces 28 on the surface of mounting member 18 connecting mounting pads 27 to connection pins 19.

As specified above, semiconductor die 17 includes a photonic device defining a working area 30 and activating terminals, which may be any of the well known devices including vertical cavity surface emitting lasers, light emitting diodes, photo detectors, photo diodes, etc. Semiconductor die 17 is preferably mounted using conventional direct chip attach (DCA) techniques. This generally includes bump bonding semiconductor die 17 to mounting pads 27 utilizing bumps 29 of a convenient electrically conductive material, including but not limited to solder, gold, conductive epoxy, etc. Bumps 29 physically and electrically couple semiconductor die 17 to the surface of mounting member 18.

Semiconductor die 17 is further positioned on mounting member 18 so that working portion 30 of the photonic device is aligned with light transmitting opening 25. Due to this alignment, if the photonic device is a transmitter (light generator), light emanating from the photonic device passes directly into light transmitting opening 25, and if the photonic device is a receiver (light detector), light passing through light transmitting opening 25 is received directly by the photonic device. It will of course be understood that semiconductor die 17 can be formed of a variety of materials, such as silicon, gallium arsenide, silicon carbide, etc.

Preferably, mounting member 18 is formed of material having a temperature coefficient of expansion which substantially matches that of semiconductor die 17 to prevent damage during temperature cycling, and is preferably formed of materials such as ceramic, glass, specific plastics, etc. Mounting member 18 is a thin, generally rectangularly shaped (see FIG. 2) substrate. In this embodiment, ridge 32 is not included. If ridges are included, electrical traces 28 can be formed over ridges 32 and in connection with connector pins 19 or ridge 32 can be deposited on mounting member 18 (and over electrical traces 28) after electrical traces 28 are formed.

While the present embodiment only includes one optical fiber 12 and one photonic device on semiconductor die 17, it will be understood by those skilled in the art that a fiber optic cable including a plurality of optical fibers (e.g. optical fiber ribbon, optical fiber bundle, etc.) and an array of photonic devices can be utilized. In this instance, light transmitting opening 25 can be a plurality of individual openings, one for each optical fiber and associated photonic device, or in some applications a slot. In this embodiment, for example, the array of photonic devices might include a mixture of light emitters and detectors.

Now with reference to FIG. 4 and FIG. 1, fabrication techniques of the assembly will be described. As is understood in the art, connector 13 includes a pair of alignment pins 36 extending axially in parallel with optical fiber 12 and beyond end 14 thereof. Mounting member 18 has a pair of spaced apart alignment holes 35 formed adjacent the periphery thereof and positioned to receive alignment pins 36 of connector 13. Alignment holes 35 are accurately positioned relative to light transmission opening (or openings) 25. This is preferably accomplished by forming alignment holes 35 then utilizing laser drilling techniques indexed by alignment holes 35 to drill light transmission opening (or openings) 25. Since alignment pins 36 of connector 18 are accurately positioned with respect to the end (or ends) 14 of optical fiber (or fibers) 12, insertion of alignment pins 36 into alignment holes 35 accurately aligns end (or ends) 14 of optical fiber (or fibers) 12 with light transmission opening (or openings) 25. Furthermore, by accurately positioning mounting pads 27 relative to alignment holes 35, the photonic device (or devices) on semiconductor die 17 are accurately aligned with light transmitting opening (or openings) 25.

Once semiconductor die 17 is properly mounted on mounting member 18 and connector 13 is engaged with mounting member 18, an optically clear material 40 is introduced as an underfill between semiconductor die 17 and mounting member 18 filling substantially all open spaces therebetween. Initially, material 40 is a liquid, such as a clear polymer, etc. which is subsequently cured to aid in forming the components into optical interface unit 15. It will be understood that optical fiber 12 may extend into light transmitting opening 25, be partially inserted, or positioned flush with the lower surface of mounting member 18. In any of these embodiments, material 40 will fill substantially all of the interstices.

At this point, sleeve 20 is brought into surrounding engagement with mounting member 18 and connector 13 as described previously. A potting compound 41 is introduced to securely fix sleeve 20 to mounting member 18 and connector 13. Initially potting compound 41 is a liquid which is easily introduced into sleeve 20 filling substantially all interstices and covering semiconductor die 17 as well as the upper surface of mounting member 18. Potting compound 41 is then cured adding substantial strength to optical fiber assembly 10 and preventing inadvertent disassembly.

It should be understood that other elements can be included prior to potting. For example, a heat sink 45 (see FIG. 1) is attached to semiconductor die 17 and mounting member 18 utilizing a thermal adhesive. Subsequently, potting compound 41 is introduced over semiconductor die and/or heat sink 45. Also, a stress relief member 46 is positioned in sleeve 20 between sleeve 20 and optical fiber 12 for relieving stress on optical fiber 12. It should be understood that stress relief member 46 may be incorporated into sleeve 20.

Thus, new and improved optical fiber assemblies have been disclosed which are relatively easy and inexpensive to fabricate. Further, a new and improved optical fiber assembly utilizing improved fabrication techniques which improve the yield has been disclosed. The disclosed optical fiber assembly is utilized to connect a fiber optic cable directly to an array of photonic devices and which optical fiber cable connects directly to electronic apparatus.

While I have shown and described specific embodiments of the present invention, further modifications and improvements will occur to those skilled in the art. I desire it to be understood, therefore, that this invention is not limited to the particular forms shown and I intend in the appended claims to cover all modifications that do not depart from the spirit and scope of this invention.

What is claimed is:

1. An optical fiber assembly comprising:

an optical fiber having a connector affixed to an end of the optical fiber, the connector having alignment pins extending axially in parallel with the optical fiber and beyond the end thereof;

a mounting member having alignment holes therein positioned to receive the alignment pins and a light transmitting opening therethrough positioned to be in axial alignment with the end of the optical fiber when the alignment pins are engaged in the alignment holes, the mounting member further having mounting pads formed thereon, a plurality of electrical connection pins extending outwardly, generally parallel with the alignment holes and electrical traces connecting the mounting pads to the plurality of electrical connection pins;

a semiconductor die having a photonic device formed thereon and defining a working area and activating terminals of the photonic device, and the semiconductor die being mounted on the mounting pads of the mounting member so that the working area of the photonic device is aligned with the light transmitting opening and the activating terminals are electrically connected to the plurality of electrical connection pins; and a sleeve surrounding the connector, the mounting member, and the electrical connection pins.

2. An optical fiber assembly as claimed in claim 1 including in addition a cured optically clear material forming an underfill between the semiconductor die and the mounting member.

3. An optical fiber assembly as claimed in claim 2 including in addition a cured potting compound positioned in the sleeve and overlying the semiconductor die and the mounting member to hold the semiconductor die and the mounting member fixedly in the sleeve.

4. An optical fiber assembly as claimed in claim 3 including in addition a stress relief member positioned in the sleeve between the sleeve and the optical fiber for relieving stress on the optical fiber.

5. An optical fiber assembly as claimed in claim 3 wherein the heat sink is affixed to a surface of the semiconductor die and to the mounting member by a thermal adhesive.

6. An optical fiber assembly as claimed in claim 1 wherein the mounting member and the semiconductor die have substantially matching temperature coefficients of expansion.

7. An optical fiber assembly as claimed in claim 6 wherein the mounting member includes ceramic.

8. An optical fiber assembly as claimed in claim 1 wherein the sleeve defines an opening for receiving therein a mating connector portion engagement with the plurality of electrical connection pins.

9. An optical fiber assembly as claimed in claim 1 including in addition a heat sink affixed to the semiconductor die.

10. An optical fiber assembly as claimed in claim 1 wherein the photonic device is one of a light emitting diode and a vertical cavity surface emitting laser.

11. An optical fiber assembly as claimed in claim 1 wherein the photonic device includes a photo diode.

12. An optical fiber assembly comprising:

a plurality of optical fibers having a connector affixed to ends of the plurality of optical fibers, the connector having alignment pins extending axially in parallel with the plurality of optical fibers and beyond the ends thereof;

a mounting member having alignment holes therein positioned to receive the alignment pins and a light transmitting opening therethrough positioned to be in axial alignment with the ends of the plurality of optical fibers when the alignment pins are engaged in the alignment holes, the mounting member further having mounting pads formed thereon, a plurality of electrical connection pins extending outwardly, generally parallel with the alignment holes and electrical traces connecting the mounting pads to the plurality of electrical connection pins;

a semiconductor die having an array of photonic devices formed thereon and defining a working area and activating terminals for each of the photonic devices, and the semiconductor die being mounted on the mounting pads of the mounting member so that the working area of the photonic device is aligned with the light transmitting opening and the activating terminals are electrically connected to the electrical connection pins;

a sleeve surrounding the connector and the mounting member; and a potting compound disposed in the sleeve around the semiconductor die, the mounting member, and the connector.

13. An optical fiber assembly as claimed in claim 12 wherein the sleeve defines an opening for receiving therein a mating connector portion in engagement with the connector pins.

14. An optical fiber assembly as claimed in claim 12 wherein the light transmitting opening in the mounting member includes a separate hole through the mounting member in alignment with each working area of each photonic device in the array.

15. An optical fiber assembly as claimed in claim 12 including in addition a cured optically clear material forming an underfill between the semiconductor die and the mounting member.

16. An optical fiber assembly as claimed in claim 15 including in addition locks formed in the connector, wherein the potting compound is disposed in the locks to further secure the mounting member with the connector.

17. An optical fiber assembly as claimed in claim 12 including in addition a heat sink affixed to the semiconductor die.

18. An optical fiber assembly as claimed in claim 12 wherein the array of photonic devices includes one of a light emitting diode, a vertical cavity surface emitting laser or a photo diode.

19. A method of fabricating an optical fiber assembly comprising the steps of:

providing an optical fiber having a connector affixed to an end of the optical fiber, the connector having alignment pins extending axially in parallel with the optical fiber and beyond the end thereof;

forming a mounting member having alignment holes therein positioned to receive the alignment pins and a light transmitting opening therethrough positioned to be in axial alignment with the end of the optical fiber when the alignment pins are engaged in the alignment holes;

forming mounting pads on the mounting member and forming a plurality of electrical connection pins extending outwardly, generally parallel with the alignment holes and electrical traces connecting the mounting pads to the plurality of electrical connection pins;

fabricating a semiconductor die with a photonic device thereon, the photonic device defining a working area and activating terminals;

mounting the semiconductor die on the mounting pads of the mounting member so that the working area of the photonic device is aligned with the light transmitting opening and the activating terminals are electrically connected to the plurality of electrical connection pins;

inserting the alignment pins of the connector in the alignment holes of the mounting member; and providing a sleeve and positioning the sleeve in surrounding engagement with the connector, the mounting member, and the plurality of electrical connection pins.

20. A method of fabricating an optical fiber assembly as claimed in claim 19 wherein the step of forming a mounting member includes drilling the light transmitting opening using a laser.

21. A method of fabricating an optical fiber assembly as claimed in claim 19 including, subsequent to the step of inserting the alignment pins of the connector in the alignment holes of the mounting member, a step of introducing an optically clear material forming an underfill between the semiconductor die and the mounting member and curing the optically clear material.

22. A method of fabricating an optical fiber assembly as claimed in claim 21 wherein the step of providing a sleeve and positioning the sleeve includes in addition a step of introducing a potting compound in the sleeve and overlying the semiconductor die and the mounting member and curing the potting compound to hold the semiconductor die and the mounting member fixedly in the sleeve.

23. A method of fabricating an optical fiber assembly as claimed in claim 19 including in addition a step of affixing a heat sink to the semiconductor die.

24. A method of fabricating an optical fiber assembly as claimed in claim 23 wherein the step of affixing the heat sink includes affixing the heat sink to a surface of the semiconductor die and to the mounting member by a thermal adhesive.

* * * * *